United States Patent [19]

Strasser et al.

[11] Patent Number: 5,634,963
[45] Date of Patent: Jun. 3, 1997

[54] DEGASSING APPARATUS AND USE THEREOF

[75] Inventors: Herbert Strasser; Bernd Felix, both of Burgkirchen; Ulrich Reiff, Neuötting; Hans-Bodo Richter, Burgkirchen; Tilman Zipplies, Burghausen, all of Germany

[73] Assignee: Hoechst Aktiengesellschaft, Germany

[21] Appl. No.: 546,614

[22] Filed: Oct. 23, 1995

[30] Foreign Application Priority Data

Oct. 25, 1994 [DE] Germany ............... 44 37 994.3

[51] Int. Cl.$^6$ .................................. B01D 19/00
[52] U.S. Cl. ................... 95/245; 95/246; 95/263; 96/196; 96/208; 96/217; 96/218; 425/203; 425/205
[58] Field of Search ............. 95/246, 265, 243, 95/245, 263; 96/193, 196, 202, 217, 204, 207, 208, 214, 216, 218; 425/203, 202, 205; 366/75

[56] References Cited

U.S. PATENT DOCUMENTS

| | | | |
|---|---|---|---|
| 2,078,565 | 4/1937 | Durst et al. | 366/75 |
| 2,572,063 | 10/1951 | Skipper | 96/196 |
| 2,785,455 | 3/1957 | McElroy | 425/203 |
| 3,257,173 | 6/1966 | Parnell | 96/202 |
| 3,609,828 | 10/1971 | Compa et al. | 425/202 |
| 3,917,507 | 11/1975 | Skidmore | 425/204 |
| 3,963,558 | 6/1976 | Skidmore | 425/203 |
| 4,077,754 | 3/1978 | Borcher et al. | 425/205 |
| 5,034,099 | 7/1991 | Nilsson | 96/196 |
| 5,064,586 | 11/1991 | Higashijima | 425/203 |
| 5,417,742 | 5/1995 | Tamhankar et al. | 95/96 |

FOREIGN PATENT DOCUMENTS 1035566  7/1966  United Kingdom .

*Primary Examiner*—Robert Davis
*Attorney, Agent, or Firm*—Connolly & Hutz

[57] ABSTRACT

An apparatus suitable in particular for degassing fluoropolymers which have been subjected to thermal degradation contains—in the direction of flow of the product—a product intake, a coolable conveyor section, a comminution apparatus, a heated conveyor section and a product discharge, the entire apparatus being designed to be gastight and advantageously being designed to be resistant to pressure surges and having a gas outlet in the area of the coolable conveyor section and/or in the area of the comminution apparatuses.

2 Claims, 1 Drawing Sheet

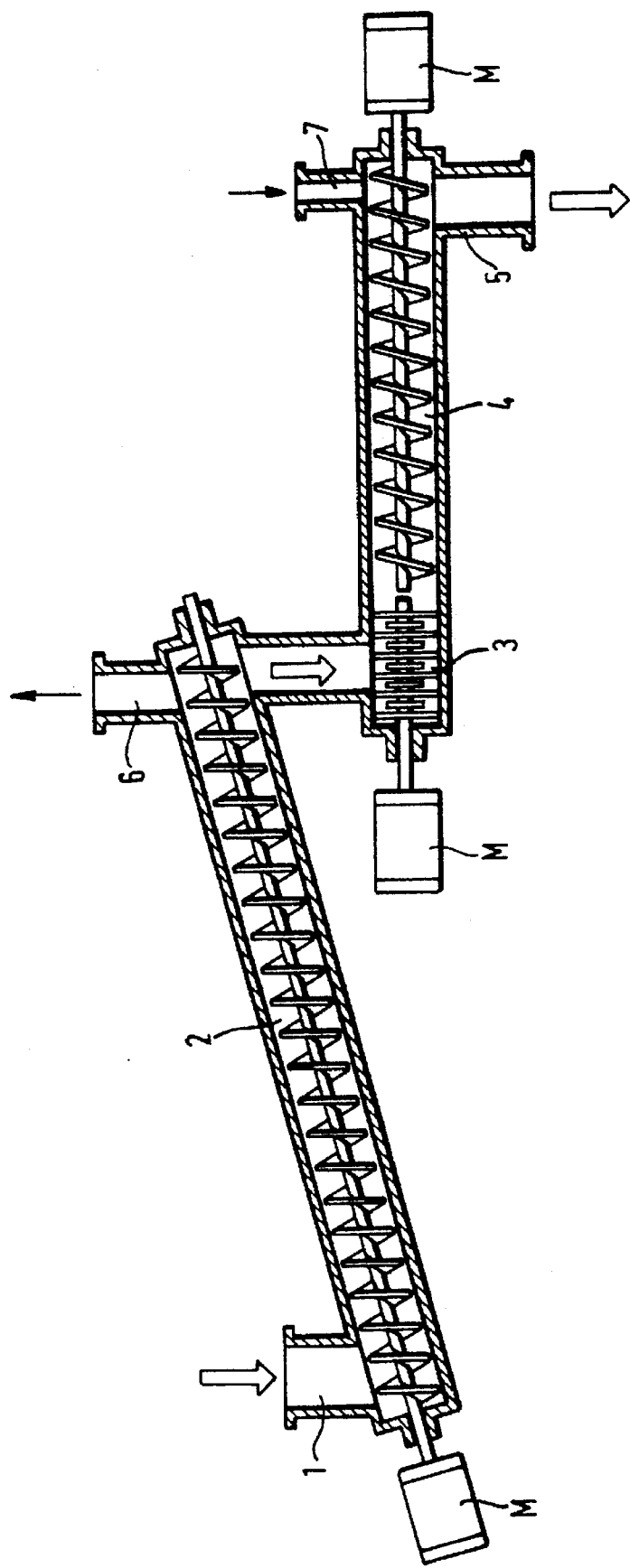

DEGASSING APPARATUS AND USE THEREOF

BACKGROUND AND SUMMARY OF THE INVENTION

The invention relates to a degassing apparatus which has the features below which are arranged in the direction of flow of the product:

a product intake, a coolable conveyor section, a comminution apparatus, a heated conveyor section and a product discharge, with the proviso that the entire apparatus is gastight and preferably also resistant to pressure surges and in the area of the coolable conveyor section and/or in the area of the comminution apparatus has a gas outlet.

The apparatus according to the invention is suitable for degassing fluoropolymers which have been subjected to a thermal degradation, in particular for the work-up of polytetrafluoroethylene waxes. These products are prepared by degradation of high molecular weight polytetrafluoroethylene, termed PTFE below (GB-A 1 035 566). They are used for a multiplicity of anti-adhesive and anti-frictional coatings.

In the thermal degradation of fluoropolymers such as PTFE, combustible gaseous byproducts are formed to a considerable extent, including the highly toxic isoperfluorobutylene which hitherto had to be disposed of. If the conversion steps are performed in separate units, extensive and complex precautions are necessary. According to the invention, this conversion is performed highly effectively in an apparatus which permits the recovery and conversion of the gases. This apparatus is highly compact and, because of its weight, also makes few requirements of the production surface.

BRIEF DESCRIPTION OF THE DRAWINGS

The FIGURE shows a diagrammatic overview of a preferred embodiment of the invention. Further preferred embodiments are described below, reference being made to the work-up of PTFE wax. However, the invention is not of course restricted to this use, but it can serve for other applications having similar requirements.

SUMMARY OF THE INVENTION

In the FIG., 1 denotes the product intake for the liquid crude PTFE wax, as obtained from thermal degradation, for example from an extruder. This crude product contains the gases formed as byproduct.

The coolable conveyor section 2 advantageously comprises a cooling screw in which the spiral is also expediently cooled. An advantageous embodiment of this part of the apparatus is represented by a so-called "scraped-surface chiller", in which both the jacket and also the cooling screw are cooled by a cooling liquid such as water or brine. The conveying section 2 can be arranged horizontally or alternatively climbing or descending.

Subsequently to the conveyor section 2, there follows the comminution apparatus 3. The transfer from 2 to 3 can be performed directly, that is all units can be arranged on the same shaft, or in batches, as shown in the FIGURE, and can then also be operated at different speeds. "M" denotes the drive motors. Depending on the arrangement, gravity can have an effect in addition to the conveying action of the possibly cooled screw.

In the comminution apparatus 3, the melt, which has solidified in the meantime, is comminuted to give a free-flowing product. All apparatuses are suitable which can comminute a relatively brittle material to give a free-flowing, readily conveyable powder of a particle size of 0.1 to 1 mm, such as crushers, for example roll crushers, hammer crushers, roll grinders, screw crushers or sawtooth crushers, mills, for example impact mills, cross-beater mills, pin mills or centrifugal mills and in particular hammer mills, and in addition cutting apparatuses such as cutting granulators or roller mills.

The material exiting from the comminution apparatus 3 is reheated in the heated conveyor section 4 in order to facilitate the degassing. In the case of the PTFE wax, it is heated to a temperature up to the vicinity of the melting point, expediently in a range of 150° to 250° C., advantageously at about 200° C. Under these conditions, the residual adsorbed amounts of gas are released to the extent that the product complies with the prescribed requirements.

The degassed product is taken off through the outlet 5 and transported for example to a storage vessel.

The gas which was introduced with the crude product in the case of the PTFE wax is removed through the gas outlet 6 and supplied to a reprocessing stage. It is possible to effect the removal of the gas merely by means of a reduced pressure at the outlet 6. However, a carrier gas is advantageously introduced in the region of the heated conveyor section 4, expediently an inert gas such as nitrogen. Relatively small volumes are sufficient for this, so that in the case of disposal, an exhaust gas burner is only lightly loaded and in the case of recovery of a valuable material, little ballast gas is admixed. A gas inlet 7 is provided for this purpose which is expediently situated at the end of the heated conveyor section 4 so that the gas is run in countercurrent to the product.

An arrangement of the gas outlet 6 at the beginning of the hot zone (seen in the direction of flow of the product) is expedient in as much as the dust loading of the exhaust gas is low in this region. Obviously, it is also possible to arrange the gas outlet 6 in the region of the product intake 1 or at any desired point of the cooling section 2.

If the apparatus according to the invention is used for another purpose, for example for a reaction in which a gas is formed or released in the course of passage, the gas outlet 6 will be arranged to suit considerations by those skilled in the art.

The apparatus according to the invention requires fewer shafts and sealing surfaces than a combination of separate apparatuses and, in the case of toxic gases, increases the operational safety. In any case, the expenditure with respect to removal of gases is considerably decreased, especially by the volume of the exhaust gases to be disposed of being drastically decreased. Moreover, the construction according to the invention is easier to maintain and requires less monitoring than conventional apparatuses.

The invention is described in more detail in the following example.

EXAMPLE 150 kg of PTFE per hour are thermally degraded in an extruder at 500°–600° C. to give PTFE wax. The PTFE melt formed in this process is introduced into the product intake 1 of the apparatus according to the invention, cooled in the coolable conveyor section 2, comminuted in the hammer mill 3 and degassed at about 200° C. for 30 minutes in the heated conveyor section 4. The degassing is reinforced by stripping with nitrogen which enters at the gas inlet 7.

About 15 kg of perfluorinated gaseous compounds arise per hour which are supplied to a utilization stage. The exhaust gas from the degassing apparatus has the following gas-chromatographic composition (in percent of total peak area):

30% $N_2$ 0.5% $O_2$

15% tetrafluoroethylene

40% hexafluoropropylene 14.5% others

We claim:

1. A gastight degassing apparatus comprising a product intake, a first conveyor section connected to the product intake for receiving product from the product intake, a comminution device connected to receive product from the first conveyor section, a heated second conveyor section connected to receive comminuted product from the comminution device, a product discharge at the downstream end of the heated second conveyor section, a gas outlet in the area of the first conveyor section or in the area of the comminution device for discharging gas released from the comminuted product, and a gas inlet in the area of the heated second conveyor section for introducing a carrier gas onto the comminuted product.

2. A process for degassing fluoropolymers subjected to thermal degradation comprising treating fluoropolymers in an apparatus as claimed in claim 1.

* * * * *